United States Patent
Stahlecker

Patent Number: 5,687,558
Date of Patent: Nov. 18, 1997

[54] FIBER SUPPLY ARRANGEMENT FOR OPEN-END ROTOR SPINNING

[75] Inventor: Fritz Stahlecker, Bad Überkingen, Germany

[73] Assignee: Hans Stahlecker, Suessen, Germany

[21] Appl. No.: 613,986

[22] Filed: Mar. 8, 1996

Related U.S. Application Data

[63] Continuation-in-part of Ser. No. 228,000, Apr. 15, 1994, abandoned, which is a continuation of Ser. No. 908,995, Jul. 6, 1992, abandoned.

[30] Foreign Application Priority Data

Jul. 13, 1991 [DE] Germany .................. 41 23 255.0

[51] Int. Cl.$^6$ ............................................. D01H 4/00
[52] U.S. Cl. ............................ 57/413; 57/411; 57/415
[58] Field of Search ........................ 57/404, 408, 411, 57/413, 415

[56] References Cited

U.S. PATENT DOCUMENTS

| | | | |
|---|---|---|---|
| 3,624,995 | 12/1971 | Rajnoha et al. | 57/413 X |
| 3,785,138 | 1/1974 | Rajnoha et al. | 57/413 |
| 3,908,349 | 9/1975 | Urifu et al. | 57/415 X |
| 4,014,162 | 3/1977 | Stahlecker | 57/413 |
| 4,245,460 | 1/1981 | Staufert et al. | 57/413 X |
| 4,291,528 | 9/1981 | Miyamoto et al. | 57/58.95 |
| 4,471,608 | 9/1984 | Kawabata et al. | 57/415 X |
| 4,731,987 | 3/1988 | Jaris et al. | 57/415 |
| 4,769,984 | 9/1988 | Raasch et al. | 57/413 X |
| 4,879,873 | 11/1989 | Kawabata et al. | 57/413 |

FOREIGN PATENT DOCUMENTS

| | | |
|---|---|---|
| 3704460 | 8/1988 | Germany . |
| 3922877 | 7/1990 | Germany ............ 57/413 |

*Primary Examiner*—William Stryjewski
*Attorney, Agent, or Firm*—Evenson McKeown Edwards & Lenahan, PLLC

[57] ABSTRACT

In the case of an open-end rotor spinning arrangement, in which the spinning rotor is arranged in a housing which is connected to a vacuum source, a fiber feeding duct is provided which extends from an opening roller to the area of a sliding surface which widens conically to form the fiber collecting surface of the spinning rotor. The smallest cross-section of the fiber feeding duct is situated at a distance from the mouth which is constructed as a slot, the height of which in the axial direction of the spinning rotor is much smaller than the ideal diameter of the smallest cross-section. The ideal diameter is defined as that diameter which corresponds to a circular area corresponding to the smallest cross-section.

32 Claims, 3 Drawing Sheets

FIBER SUPPLY ARRANGEMENT FOR OPEN-END ROTOR SPINNING

This is a continuation-in-part application of co-pending application Ser. No. 08/228,000, Apr. 15, 1994, now abandoned, which application was a continuation application of application Ser. No. 07/908,995 filed Jul. 6, 1992, now abandoned.

BACKGROUND AND SUMMARY OF THE INVENTION

This invention relates to an arrangement for open-end rotor spinning comprising a spinning rotor which has a fiber collecting groove and a sliding surface which conically widens to the fiber collecting groove. A mouth of a fiber feeding duct is directed toward the sliding surface. The fiber feeding duct tapers in the fiber transport direction and starts at an opening roller. A housing which receives the spinning rotor is connected to a vacuum source and is provided with a covering which has a projection which projects into the open end of the spinning rotor while leaving an overflow gap for transport air and contains the mouth of the fiber feeding duct. The fiber feeding duct starts at the opening roller with a width that corresponds to the working width of the opening roller. The mouth of the fiber feeding duct is larger in the circumferential direction of the spinning rotor than in its axial direction.

An arrangement of this type represents the state of the art on the basis of the German Patent Document DE 37 04 460 A1. In the case of the construction of the known arrangement, the mouth of the fiber feeding duct has the smallest cross-section which, however, because of its special development, is so large that a sufficient amount of transport air can flow through the fiber feeding duct. The reason is that the amount of transport air is largely determined by the fact that a fly is to be avoided in the area of the opening roller. On the one hand, the feeding of the supplied fibers onto the sliding surface of the spinning rotor should take place at a sufficient distance from the fiber collecting groove and, on the other hand, at a safe distance from the open end of the spinning rotor. For this reason, in the known arrangement, the height of the fiber feeding duct in the axial direction of the spinning rotor should be kept as small as possible. However, so that nevertheless a sufficient amount of air can flow out through the mouth of the fiber feeding duct, the mouth is wider than normal in the circumferential direction of the spinning rotor. The problems with respect to the height of the mouth in the axial direction of the spinning rotor occur particularly in the case of high-speed arrangements for open-end rotor spinning which use particularly small spinning rotors of diameters that are partially below 30 mm. The known arrangement is a step in the right direction, but is not extensive enough.

Arrangements for open-end rotor spinning comprising so-called fiber guiding screens are known, as described, for example, in the German Patent Document DE 37 19 959 A1. Fiber guiding screens of this type have the purpose of separating the fibers to be fed to the sliding surface from the yarn to be withdrawn from the fiber collecting groove of the open-end spinning rotor. Even when the fiber feeding ducts are relatively short, such fiber guiding screens are capable of guiding the fibers at a secure distance from the fiber collecting groove onto the sliding surface. However, the fiber guiding screens used in the machines in practice have the disadvantage that the fiber feeding ducts connected in front of them are so short that the fed fibers are not sufficiently stretched and arranged in parallel.

The invention is based on the object of developing an arrangement of the initially mentioned type in such a manner that the spinning can take place by means of small spinning rotors, in which case the supplied fibers are fed onto the sliding surface of the spinning rotor in a targeted manner and in which case the air throughput through the fiber feeding duct is sufficient with respect to keeping the opening roller clean.

As noted above, the present invention is especially advantageous for spinning with spinning rotors having a maximum diameter at the collecting groove of less than 30 mm. In certain preferred embodiments of the invention the maximum diameter of the collecting groove is between 26 mm and 30 mm, with optimum practical embodiments having a collecting groove diameter of about 28 mm.

With these small diameter collecting grooves, the rotors contemplated by the invention preferably have a rotor open end diameter of between 21 mm and 23 mm, with optimum practical embodiments having a rotor open end diameter of about 22 mm. The angle of the fiber slide wall, from the fiber impact on the rotor wall to the collecting groove with respect to a rotor radial plane, is preferably between 76° and 79°, with optimum practical embodiments having such slide wall inclined at 77.5° with respect to a rotor radial plane.

This object is achieved according to preferred embodiments of the invention in that the smallest crosssection of the fiber feeding duct is at a distance from the mouth and in that the mouth is constructed as a slot the height of which, in the axial direction of the spinning rotor, is significantly smaller than the ideal diameter of the smallest cross-section, in which case the ideal diameter is defined as the diameter of a circular area corresponding to the smallest cross-section.

The smallest cross-section of the fiber feeding duct tapering to this point is therefore placed back into an area in which it does not yet present any difficulties constructionally to dimension the size of the crosssection for a sufficient air throughput. By means of the construction as a slot, the height of the mouth of the fiber feeding duct in the axial direction of the spinning rotor can be maintained sufficiently small so that, if possible, all fibers fed onto the sliding surface still have a sufficiently long sliding path to the fiber collecting groove. The outlet cross-section on the mouth is nevertheless dimensioned to be sufficiently ample because no extreme precision of the fiber feeding is required in the circumferential direction of the spinning rotor. It is largely unimportant at which angular degree of the circumference the fibers arrive on the sliding surface. It is only with respect to the distance from the fiber collecting groove and from the open end of the spinning rotor that extreme precision is required.

According to especially preferred embodiments of the invention, the fiber feeding duct mouth is disposed and dimensioned so that the fiber impact point on the rotor wall is disposed at a position more than two-thirds (⅔) of the total axial length of the spinning rotor between the fiber collecting groove and the open end of the rotor. This assures a sufficiently long travel path from the fiber impact point to the collection grooves for all of the supplied fibers, even with the small diameter rotors of the type contemplated by the invention.

In an advantageous development of the invention, the length of the fiber feeding duct corresponds at least to twice the medium staple length of the fiber material to be spun. A sufficiently long fiber feeding duct has the advantage that a certain stretching of the fibers takes place in it. The fiber feeding duct has an aligning effect which is also created by the fact that the air is accelerated in the transport direction of the fibers. The combination is obtained of a good stretching of the fibers with a very precise feeding onto the sliding surface without any reduction of the available air.

Advantageously, the slot is bounded on the side facing the fiber collecting groove by a fiber guiding surface which extends directly to the sliding surface. As a result, the fibers can be transferred to the sliding surface of the spinning rotor in a particularly targeted manner.

Advantageously, the smallest cross-section of the fiber feeding duct has a circular area. It was found that round fiber feeding ducts are particularly advantageous with respect to the fiber orientation. However, after the fibers have been bundled, it is no longer disadvantageous if the cross-section of the fiber feeding duct changes directly at the mouth. In a further development of the invention, the slot therefore has a rectangular cross-section. This results, on the one hand, in the sufficient air throughput which is not longer reduced with respect to the smallest cross-section and, on the other hand, in the precise target direction when the fibers are fed onto the sliding surface.

In especially preferred embodiments of the invention, the ideal diameter at the smallest cross-section of the fiber feeding duct is between 4 mm and 5 mm, with optimum practical embodiments having an ideal diameter of 4.5 mm, resulting in a cross-sectional area of about 17 mm². Especially preferred embodiments then have a corresponding axial extent of the fiber feeding mouth slit of between 2 mm and 3 mm. This configuration of the fiber feeding duct facilitates the desired fiber feeding impact point on the rotor side wall at a position at least two-thirds (⅔) of the axial length of the distance between the collecting groove and the rotor open end, while also assuring that the supplied fibers are not spilled over the open end of the rotor.

Advantageously, the length of the slot corresponds to approximately half the diameter of the spinning rotor. Thus, the fibers are guided along a sufficient length on the fiber guiding surface.

The fiber guiding surface definitely does not have to be situated perpendicularly with respect to the axis of the spinning rotor but may be constructed to be askew with respect to this axis. The fiber guiding surface may therefore be adapted to the natural moving direction of the fibers.

In a particularly advantageous further development of the invention, the mouth is arranged in a separate component containing the end section of the fiber feeding duct. As a result, the mouth can be manufactured in any manner because it can be produced separately from the fiber feeding duct and is subject to virtually no limitations with respect to its shape. The reason is that it is difficult to provide a one-piece fiber feeding duct, starting from the working width of the opening roller, later with a round cross-section and provide it again at the mouth with a rectangular shape. However, the separate component allows such a shape.

The separate component can advantageously be exchanged for an adaptation to different fiber materials and/or spinning conditions. Thus, the fiber feeding duct, as a whole, can be maintained but the critical area of its mouth can nevertheless be adapted to the respective conditions, particularly when especially small diameters of spinning rotors are used.

Expediently, the overflow gap is reduced in the area of the mouth of the fiber feeding duct. As a result, it is avoided that in this particularly critical area air flows off over the front rotor edge and thus removes fed fiber in an undesirable manner instead of having these fibers transported to the fiber collecting groove.

The fiber guiding surface is expediently constructed as a circular segment. As a result, the fed fibers can be guided to the sliding surface in an approximately tangential direction.

Preferably, the height of the slot is smaller than half the ideal diameter of the smallest cross-section of the fiber feeding duct. On the one hand, this permits a high availability of air but, on the other hand, a precise feeding of the fiber onto the sliding surface.

Other objects, advantages and novel features of the present invention will become apparent from the following detailed description of the invention when considered in conjunction with the accompanying drawings.

DETAILED DESCRIPTION OF THE DRAWINGS

Figures 1, 1A:
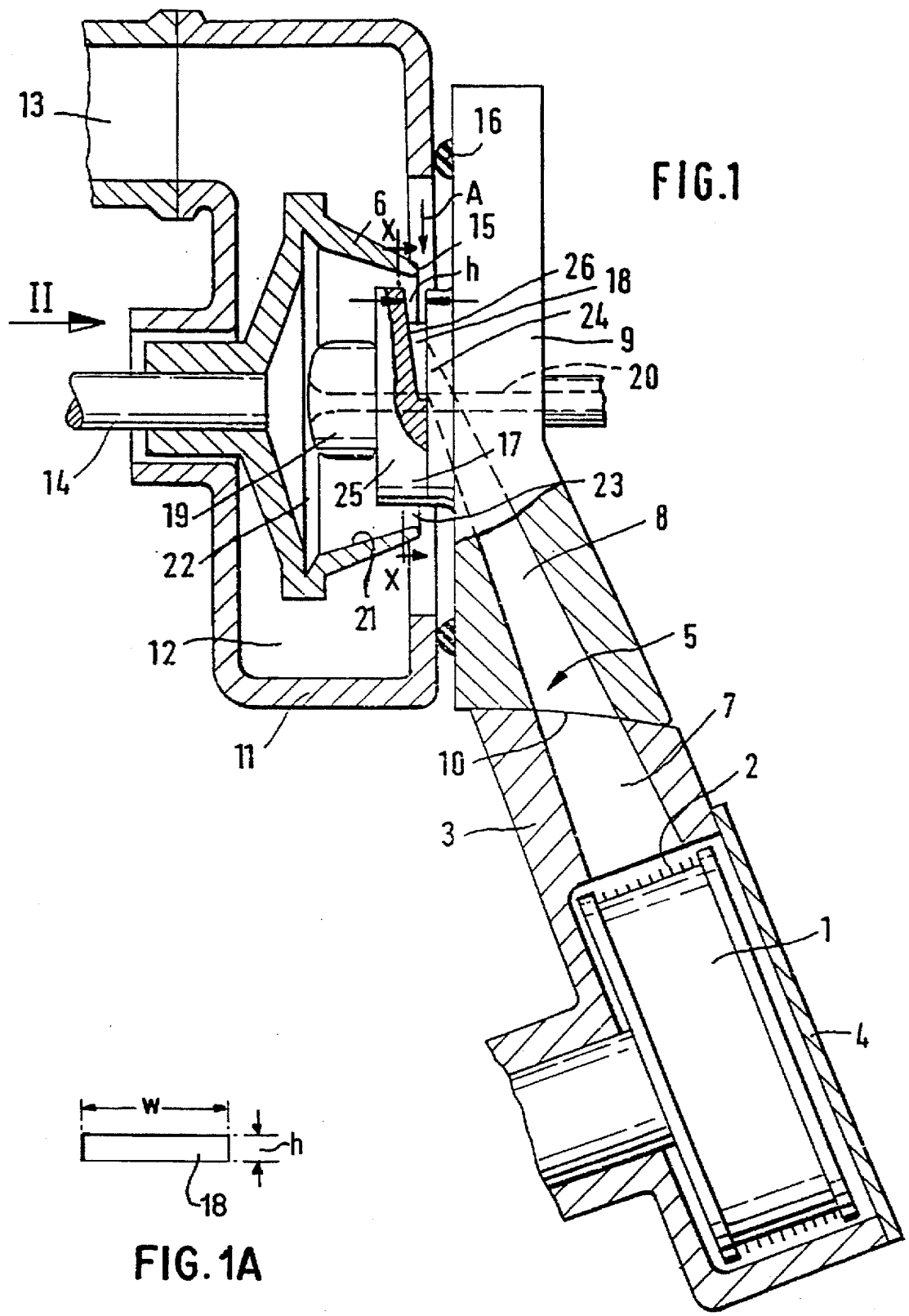
FIG. 1 is a sectional view of a largely schematic representation of an arrangement for open-end rotor spinning, constructed according to a preferred embodiment of the invention.
FIG. 1A is a schematic radial view of the mouth of the fiber feeding duct taken in the direction depicted by arrow A in FIG. 1.

FIG. 1 shows only the parts of an arrangement for open-end rotor spinning which are required for understanding the invention.. The other components, which are not shown, may correspond to the design of arrangements for open-end rotor spinning which are currently customary.

The arrangement according to FIG. 1 comprises an opening roller 1 which is provided on its circumference with a mounting 2 of needles or saw teeth. The opening roller 1 is disposed in a housing 3 and is driven outside the housing 3 in a manner which is not shown. On the operating side, the opening roller 1 is closed off by a covering 4.

By way of a feeding device, which is not shown, a sliver is fed to the opening roller 1, which sliver is combed out by the opening roller 1 and in the process is separated into individual fibers. The fibers which are separated by the opening roller 1 are fed by way of a fiber feeding duct 5 to a spinning rotor 6. The fiber feeding duct 5 starts with a first section 7 extending approximately tangentially with respect to the opening roller 1 in the housing 3. Part 7 of the fiber feeding duct 5 is continued in a straight line from part 8 which is a component of a covering 9. In a manner which is not shown, the covering 9 is movably mounted on the arrangement for open-end rotor spinning in such a manner that, because it is moved away, the spinning rotor 6 can be exposed on its front side. Between parts 7 and 8 of the fiber feeding duct 5, a sliding joint 10 is disposed, in which a sealing device is provided so that no secondary air penetrates into the fiber feeding duct.

The spinning rotor 6 is arranged in a housing 11 which forms a vacuum chamber 12 which is connected to a vacuum pipe 13. The spinning rotor 6 is provided with a shaft 14 which penetrates the rear wall of the housing 11 and which is disposed and driven outside the housing 11 in a manner that is not shown in detail.

The covering 9 closes off the housing 11 containing the spinning rotor 6 on the side of the open end 15 of the spinning rotor 6. Between the housing 11 and the covering 9, a surrounding sealing ring 16 is arranged. The covering 9 is provided with a projection 17 which projects into the spinning rotor 6. The projection 17 contains the mouth 18 of the fiber feeding duct 5 which will be explained in detail in the following.

Concentrically to the spinning rotor 6, a yarn withdrawal nozzle 19 is provided in the projection 17, a yarn withdrawal duct 20 beginning in this yarn withdrawal nozzle 16.

The spinning rotor 6 has a sliding surface 21 which widens from the open end 15 of the spinning rotor 6 conically into a fiber collecting groove 22. During the spinning, the fibers are transported from the opening roller 1 by way of the fiber feeding duct 5 in an air current to the sliding surface 21. Inside the spinning rotor 6, the air current is separated from the fibers. The air current flows off toward the outside by way of a ring gap 23 which was left between the open end 15 of the spinning rotor 6 and the projection 17 as well as the interior surface of the covering 9.

Because of the high centrifugal force affecting them, the fibers slide on the sliding surface 21 into the fiber collecting groove 22 where they are collected and bound into a yarn which is withdrawn by way of the yarn withdrawal nozzle 19 and the yarn withdrawal duct 20.

During the spinning, in must be ensured that the fibers arrive on the sliding surface 21 at a sufficient distance from the fiber collecting groove 22 so that they can slide in such a manner that they are still stretched and placed in parallel. In addition, it must be ensured that, if possible, no fibers are sucked by way of the open end 15 of the spinning rotor 6 through the ring gap 23. This presents a problem especially when particularly in the case of high rotational speeds of the spinning rotor 6—extremely small spinning rotors 6 are used, for example with a diameter of approximately 30 mm in the fiber collecting groove 22. The mouth 18 of the fiber feeding duct 5 cannot be reduced to the same extent because when the required amount of air would no longer flow through the fiber feeding duct 5.

FIG. 1A schematically depicts the radial projection of the mouth 18, having the height h in the axial direction and a width w. However, an amount of air that is too small would result in fiber fly accumulation on the opening roller 1.

According to the invention, the narrowest cross-section 24 of the fiber feeding duct 5 is at a distance from the mouth 18 which is constructed as a slot in a manner indicated below. The smallest cross-section 24 advantageously is a circular area; however, it may also have an oval or other design. Based on the smallest cross-section 24, a circular cross-section of an equal size can be calculated, the diameter of which is called the ideal diameter and must clearly be larger than the height h of the slot forming the mouth 18, in the axial direction of the spinning rotor 6.

In the case of the construction according to FIG. 1, the mouth 18 is advantageously situated in a separate component 25. This separate component 25 is part of the cover 9 which, however, —apart from the mouth 18—is no longer in one piece with the component containing part 8 of the fiber feeding duct 5. As a result, the slot for the mouth 18 can easily be designed according to the invention. As it were, an intermediate piece which contains the mouth 18 and forms the separate component 25 is inserted between the yarn withdrawal nozzle 19 and the actual fiber feeding duct 5. This separate component 25 may be considered as a thick washer which contains a recess with a fiber guiding surface 26.

The construction of the fiber guiding surface 26 and the design of the slot of the mouth 18 can be determined by testing. Both constructions are such that the fibers passing through the fiber feeding duct 5 are kept from arriving on the sliding surface 21 too closely to the fiber collecting groove 22. The height h of the slot should correspond only to approximately half the ideal diameter of the smallest cross-section 24 so that the fibers arrive on the sliding surface 21 in a well bundled state. As will be illustrated in the following by means of FIGS. 2 to 5, the slot is wider in the circumferential direction of the spinning rotor 6. The mouth 18 is therefore constructed as a transversely placed loophole.

The arrangement according to the invention has the advantage that there are virtually no more fibers which arrive directly in the fiber collecting groove 22 and then result in the feared "balloon fibers". Particularly, extremely long balloon fibers lead to very taut "balloon bands". Fibers which directly reach the fiber collecting groove 22 without sufficient prior contact with the sliding surface 21 are wound up along their full length which has a negative effect on the yarn quality. Naturally, it is hardly possible to avoid balloon fibers particularly in the case of small rotors 6, but the important aspect is the avoiding of extremely long balloon fibers.

Figure 2:
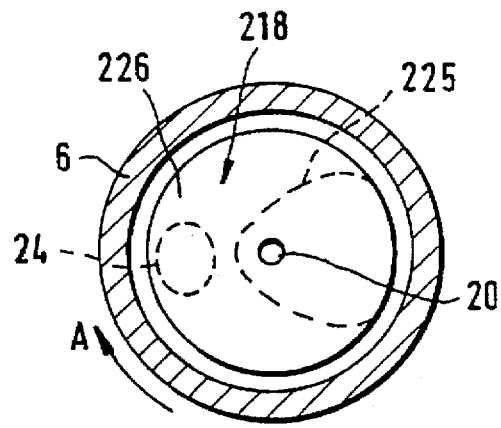
FIGS. 2 to 5 are partially sectional views in the direction of arrow II along section line X—X of FIG. 1 of the area of the mouth of the fiber feeding duct, showing alternative preferred embodiments of the invention.

FIG. 2 illustrates a separate component 225 with a slot-type mouth 218 and a fiber guiding surface 226. Also shown is the smallest cross-section 24 of the fiber feeding duct 5, as it meets the separate component 225. The slot of the mouth 218 already starts in front of the smallest cross-section 24 and also continues behind it in the rotating direction A so that the air ring rotating along with the spinning rotor 6 promotes the fiber movement The fibers coming cut of the mouth 218 therefore receive "tail wind".

Figure 3:
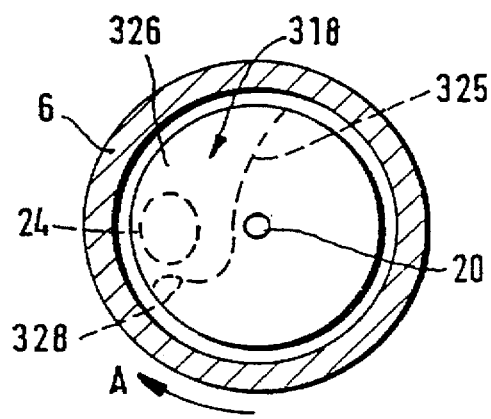

When the contour of the component 3 2 5 is constructed corresponding to FIG. 3, the fiber guiding surface 326 starts in the area of the narrowest cross-section 24 with a wall 328. As a result of this shape, the "nail wind" is avoided.

Figure 4:
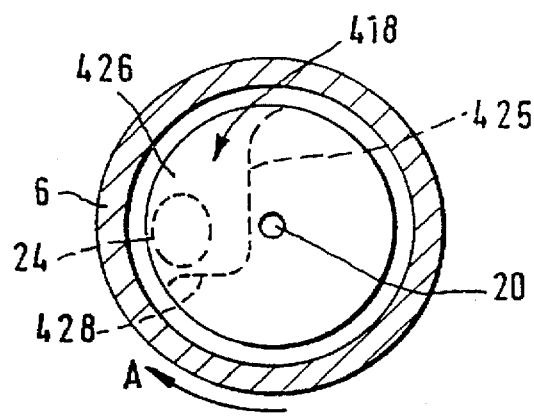

The "tail wind" is also avoided in the case of the construction according to FIG. 4 but, as a result of the design of the wall 428, not as much as in the embodiment according to FIG. 3.

Figure 5:
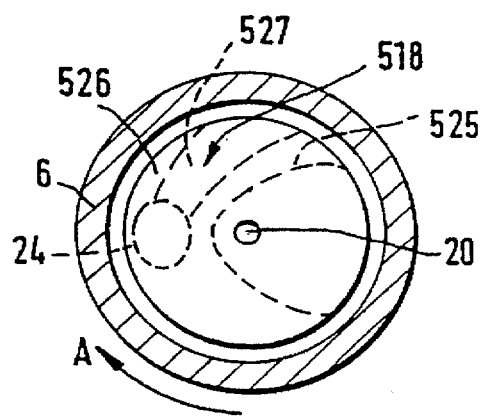

The slot-shaped mouth and the fiber guiding surface 526 according to FIG. 5 correspond largely to the construction according to FIG. 2, in which case, however, a flute 527 is provided in the fiber guiding surface 526 which has the purpose of providing the fibers with such 2 direction that these arrive on the sliding surface 21 of the spinning rotor 6 as tangentially as possible.

As illustrated in FIGS. 2 to 5, the fiber guiding Surface 226, 326, 426 and 526 is constructed as a circular segment. Viewed in the fiber transport direction, the smallest cross-section 24 of the fiber feeding duct 5 is in each case situated in front of the fiber-guiding surface 226, 326, 426 and 526. From here, the fibers are shot onto the sliding surface 21.

The separate component 225, 325, 425 and 525 opens up different design possibilities without any manufacturing difficulties. According to the spinning conditions, the area of the mouth 18 may have variable designs. In this case, it is advantageous that the known advantages of a long fiber feeding duct 5 are not lost despite the slot-shaped mouth 18.

If necessary, the described fiber guiding surfaces 226, 326, 426 and 526 may have very varied surface structures in view of the fact that wear must be avoided, but also with the goal of facilitating the sliding of the fiber. In particular, it should be endeavored to obtain a smooth dirt-repelling surface.

Figure 6:
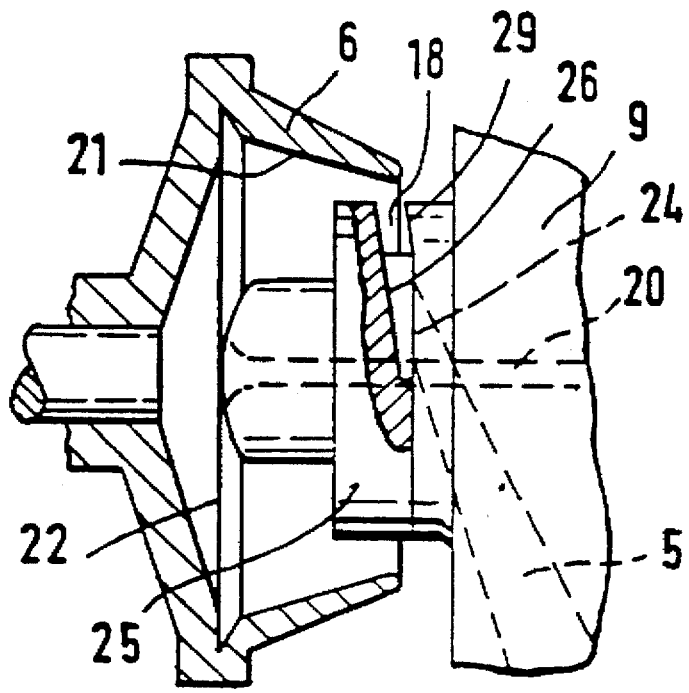
FIGS. 6 and 7 each represent a partial sectional view similar to FIG. 1 in the area of the mouth of the fiber feeding duct, constructed according to respective preferred embodiments of the invention.
Figure 7:
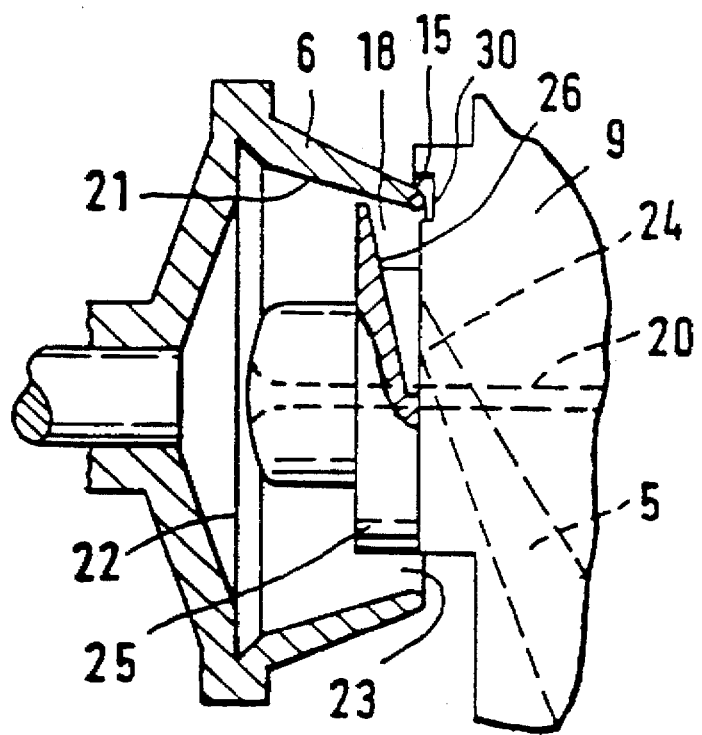

In the embodiments according to FIGS. 6 and 7, the same components have the same references numbers as in the case of the previously described embodiments. The description will therefore not be repeated.

FIG. 6 includes designations for basic dimensions of especially preferred embodiments of the invention. These basic dimensions also apply to the embodiments of FIGS. 1 and 7 in a corresponding manner as shown in FIG. 6. These basic dimensions are as follows:

(i) The diameter $D_G$ of the fiber collecting groove is between 26 mm and 30 mm, with an optimum practical embodiment having a diameter $D_G$ of about 28 mm.

(ii) The angle $\alpha$ of the rotor fiber slide wall between the fiber impact location F (from mouth 18) and the collecting groove, with respect to a radial plane P—P, is between 76° and 79°, with an optimum practical embodiment having an angle X of abut 77.5°.

(iii) The diameter $D_O$ of the open end of the rotor is between 21 mm and 23 mm, with an optimum practical embodiment having a diameter $D_O$ of 22 mm.

(iv) The axial length $S_L$ of the sliding surface between the closest fiber impact point F and the collecting groove is at least two-thirds (⅔) of the axial length $R_L$ of the rotor.

(v) The ideal diameter of the fiber feeding duct at section 24 is between 4 and 5 mm, with an optimum practical embodiment having an ideal diameter of 4.5 mm. This corresponds to a cross-sectional area of about 17 mm$^2$ and produces a mouth of the feeding duct having a height h in the axial direction of between 2 and 3 mm.

In the embodiment according to FIG. 6, the slot type mouth 18 of the fiber feeding duct 5 is made still narrower toward its top because of the fact that the area of the covering 9 carrying the separate component 25 is provided with an elevation 29 which is directed toward the fiber guiding surface 26 of the mouth 18. As a result of this design, the slot becomes still narrower. The air throughput is nevertheless sufficient because the mouth 18 is sufficiently wide in the circumferential direction of the spinning rotor 6.

In the case of the embodiment according to FIG. 7, the ring gap 23 is reduced in the area of the mouth 18. In the present case, a type of labyrinth seal 30 is provided which extends only in the area of the mouth 18. As a result, it is prevented that fibers in the area of the mouth 18 are guided away by way of the front end 15 of the spinning rotor 6.

In FIG. 7, it is also provided that the fiber guiding surface 26 extends as closely as possible to the sliding surface 21. For this reason, when the cover 9 is moved away from the spinning rotor 6, the movement must take place into a direction which prevents that the fiber guiding surface 16 comes in contact with the sliding surface 21. A corresponding forced guiding must be provided so that the sliding surface 21 is not damaged by the fiber guiding surface 26.

The invention makes it possible to shoot the fibers in a stretched and bundled form accurately at a sufficient distance from the fiber collecting groove 22 onto the sliding surface 21, despite the sufficient air throughput.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An open-end rotor spinning arrangement comprising:
   a rotor housing,
   a spinning rotor disposed in said rotor housing, said spinning rotor having an open end, a fiber collecting groove, a sliding surface which conically widens from adjacent the open end to the fiber collecting groove, and a closed bottom,
   a fiber feeding duct defining a fiber feeding path and extending between a fiber opening device and a fiber feeding mouth, said fiber feeding mouth opening towards the sliding surface, and
   a cover which has a projection which in use projects into the open end of the spinning rotor while leaving an overflow gap for transport air, said cover containing the fiber feeding mouth,
   wherein said fiber feeding duct exhibits a delivery cross-section which is a smallest cross-section of the fiber feeding duct, said delivery cross-section having an ideal diameter defined as the diameter of a circular area equivalent to the area of the delivery cross-section,
   wherein said mouth is a slot-shaped mouth extending in close proximity to the sliding surface and having a height in an axial direction of the spinning rotor which is smaller than said ideal diameter and a width in a circumferential direction of the spinning rotor which is significantly larger than said ideal diameter, said mouth having a mouth cross-sectional area at least the size of the delivery cross-section,
   and wherein said slot-shaped mouth is bounded on its axial side nearest the fiber collecting groove by a substantially radially extending fiber guiding surface which deflects travel path of substantially all fibers in a radially outward direction toward an initial fiber impact location on the sliding surface which is spaced from the collecting groove by at least ⅔ of the total axial length of the rotor from said open end of the rotor to said collecting groove, whereby stretching and parallelizing of said fibers on said sliding surface is facilitated.

2. An arrangement according to claim 1, wherein the length of the fiber feeding duct corresponds to at least twice the medium staple length of the fiber material to be spun.

3. An arrangement according to claim 1, wherein the smallest cross-section of the fiber feeding duct is a circular area.

4. An arrangement according to claim 1, wherein the mouth has a rectangular cross-section.

5. An arrangement according to claim 1, wherein the width of the mouth corresponds to approximately half the diameter of the spinning rotor.

6. An arrangement according to claim 1, wherein the fiber guiding surface is inclined with respect to both axial and radial directions of the spinning rotor.

7. An arrangement according to claim 1, wherein the mouth is arranged in a separate component containing an end piece of the fiber feeding duct.

8. An arrangement according to claim 7, wherein the component is detachably connected to the remaining part of the fiber feeding duct so that it is exchangeable for an adaptation to at least one of different fiber materials and different spinning conditions.

9. An arrangement according to claim 1, wherein the overflow gap has a reduced area near the area of the mouth.

10. An arrangement according to claim 1, wherein the fiber guiding surface is constructed as a circular segment.

11. An arrangement according to claim 1, wherein the height of the slot-shaped mouth is smaller than half the ideal diameter.

12. An arrangement according to claim 1, wherein said fiber collecting groove has a maximum diameter of 30 mm.

13. An arrangement according to claim 1, wherein said fiber collecting groove has a maximum diameter of between 26 mm and 30 mm.

14. An arrangement according to claim 13, wherein said fiber collecting groove has a maximum diameter of about 28 mm.

15. An arrangement according to claim 1, wherein the open end of said rotor has a diameter between 21 mm and 23 mm.

16. An arrangement according to claim 15, wherein said sliding surface is inclined at an angle of between 76° and 79° with respect to a radial plane of said rotor.

17. An arrangement according to claim 16, wherein said ideal diameter is between 4 and 5 mm and said height of said slot shaped mouth is between 2 mm and 3 mm.

18. An arrangement according to claim 17, wherein the height of the slot-shaped mouth is smaller than half the ideal diameter.

19. An arrangement according to claim 1, wherein the open end of said rotor has a diameter between 21 mm and 23 mm.

20. An arrangement according to claim 1, wherein said sliding surface is inclined at an angle of between 76° and 79° with respect to a radial plane of said rotor.

21. An arrangement according to claim 1, wherein said ideal diameter is between 4 and 5 mm and said height of said slot shaped mouth is between 2 mm and 3 mm.

22. An open-end rotor spinning arrangement comprising:
   a rotor housing,
   a spinning rotor disposed in said rotor housing, said spinning rotor having an open end, a fiber collecting groove, a sliding surface which conically widens from adjacent the open end to the fiber collecting groove, and a closed bottom,
   a fiber feeding duct defining a fiber feeding path and extending between a fiber opening device and a fiber feeding mouth, said fiber feeding mouth opening towards the sliding surface, and
   a cover which has a projection which in use projects into the open end of the spinning rotor while leaving an overflow gap for transport air, said cover containing the fiber feeding mouth,
   wherein said fiber feeding duct exhibits a delivery cross-section which is a smallest cross-section of the fiber feeding duct, said delivery cross-section having an ideal diameter defined as the diameter of a circular area equivalent to the area of the delivery cross-section,
   wherein said mouth is a slot-shaped mouth extending in close proximity to the sliding surface and having a height in an axial direction of the spinning rotor which is smaller than half said ideal diameter and a width in a circumferential direction of the spinning rotor which is significantly larger than said ideal diameter, said mouth having a mouth cross-sectional area at least the size of the delivery cross-section,
   and wherein said mouth is bounded on its axial side nearest the fiber collecting groove by a substantially radially extending fiber guiding surface which deflects a travel, path of substantially all fibers in a radially outward direction toward a location on the sliding surface which is a sufficient distance from the collecting groove to facilitate stretching and parallelizing of said fibers on said fiber guiding surface.

23. An arrangement according to claim 22, wherein the length of the fiber feeding duct corresponds to at least twice the medium staple length of the fiber material to be spun.

24. An arrangement according to claim 22, wherein the smallest cross-section of the fiber feeding duct is a circular area.

25. An arrangement according no claim 24, wherein the width of the slot-shaped mouth corresponds to approximately half the diameter of the spinning rotor.

26. An arrangement according to claim 22, wherein the mouth has a rectangular cross-section.

27. An arrangement according to claim 22, wherein the width of the mouth corresponds to approximately half the diameter of the spinning rotor.

28. An arrangement according to claim 22, wherein the fiber guiding surface is inclined with respect to both axial and radial directions of the spinning rotor.

29. An arrangement according to claim 22, wherein the mouth is arranged in a separate component containing an end piece of the fiber feeding duct.

30. An arrangement according to claim 29, wherein the component is detachably connected to the remaining part of the fiber feeding duct so that it is exchangeable for an adaptation to at least one of different fiber materials and different spinning conditions.

31. An arrangement according to claim 1, wherein the overflow gap has a reduced area near the area of the mouth.

32. An arrangement according to claim 11, wherein the fiber guiding surface is constructed as a circular segment.

* * * * *